(12) United States Patent
Murate et al.

(10) Patent No.: US 7,695,604 B2
(45) Date of Patent: Apr. 13, 2010

(54) METHOD FOR PRODUCING SEPARATOR AND ELECTRODEPOSITION COATING DEVICE

(75) Inventors: Masashi Murate, Nagoya (JP); Takashi Yamada, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 724 days.

(21) Appl. No.: 11/658,347

(22) PCT Filed: Sep. 12, 2005

(86) PCT No.: PCT/IB2005/002694

§ 371 (c)(1),
(2), (4) Date: Jan. 24, 2007

(87) PCT Pub. No.: WO2006/030276

PCT Pub. Date: Mar. 23, 2006

(65) Prior Publication Data

US 2008/0135414 A1 Jun. 12, 2008

(30) Foreign Application Priority Data

Sep. 13, 2004 (JP) .............................. 2004-265386

(51) Int. Cl.
*C25D 5/02* (2006.01)
(52) U.S. Cl. .................... 205/134; 205/118; 204/224 R
(58) Field of Classification Search ................. 205/118, 205/128, 134; 204/224 R, 224 M
See application file for complete search history.

(56) References Cited

U.S. PATENT DOCUMENTS

| | | | |
|---|---|---|---|
| 2,974,097 A | 3/1961 | Ramirez et al. | |
| 3,476,661 A | 11/1969 | Jahn | |
| 4,039,398 A | 8/1977 | Furuya | |
| 6,077,412 A | 6/2000 | Ting et al. | |
| 6,586,343 B1 | 7/2003 | Ho et al. | |
| 2003/0010640 A1 | 1/2003 | Kholodenko | |
| 2003/0072988 A1 | 4/2003 | Frisch et al. | |
| 2003/0143451 A1 | 7/2003 | Andou et al. | |

FOREIGN PATENT DOCUMENTS

| | | |
|---|---|---|
| DE | 43 26 430 A1 | 2/1995 |
| JP | A 05-290646 | 11/1993 |
| JP | 09-262519 | 10/1997 |
| JP | A 09-262519 | 10/1997 |

(Continued)

*Primary Examiner*—Nam X Nguyen
*Assistant Examiner*—Luan V Van
(74) *Attorney, Agent, or Firm*—Oliff & Berridge, PLC

(57) ABSTRACT

A primer (16) for forming a resin frame (17) is formed on an outer end portion (16p) of a separator (1) of a fuel cell. An electrodeposition coating device (2) includes an upper frame (21) and a lower frame (22), and covers only the outer end portion (16p) of the substrate (11) with a center portion (12) of the substrate (11) left uncovered. When the substrate (11) is sandwiched between the upper frame (21) and the lower frame (22) of the electrodeposition coating device (2), an annular electrodeposition chamber (31) is formed with the outer end portion (16p) of the substrate (11) located in the electrodeposition chamber (31). Then, the electrodeposition chamber (31) is filled with an electrodeposition coating solution (32), and electrodeposition coating is performed. Then, cleaning is performed by using purified water, and drying is performed by using hightemperature air.

19 Claims, 7 Drawing Sheets

FOREIGN PATENT DOCUMENTS

| | | |
|---|---|---|
| JP | 11-129396 | 5/1999 |
| JP | A 11-129396 | 5/1999 |
| JP | 2002-158018 | 5/2002 |
| JP | A 2002-158018 | 5/2002 |
| JP | 2002-263534 | 9/2002 |
| JP | A 2002-263534 | 9/2002 |
| JP | 2003-223903 | 8/2003 |
| JP | A 2003-223903 | 8/2003 |
| JP | 2004-031166 | 1/2004 |
| JP | A 2004-031166 | 1/2004 |

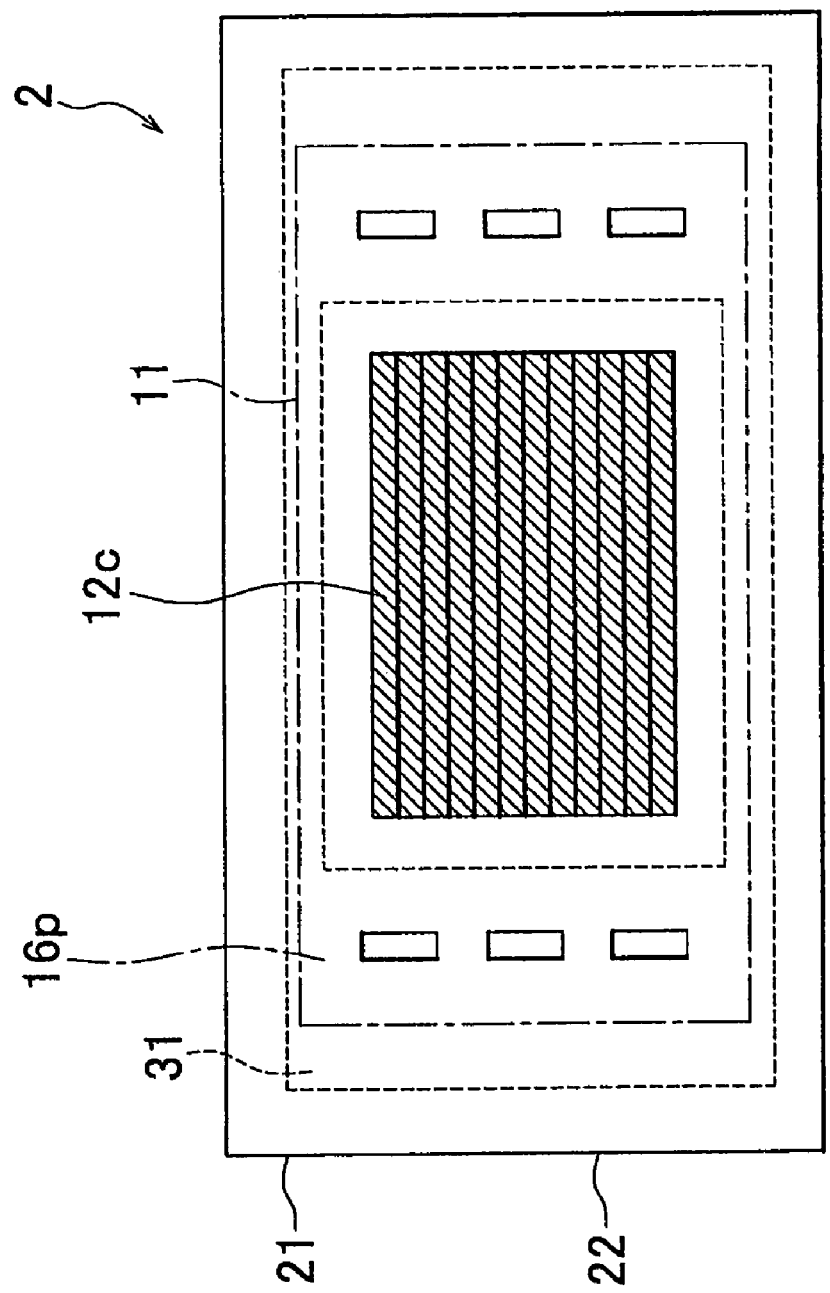

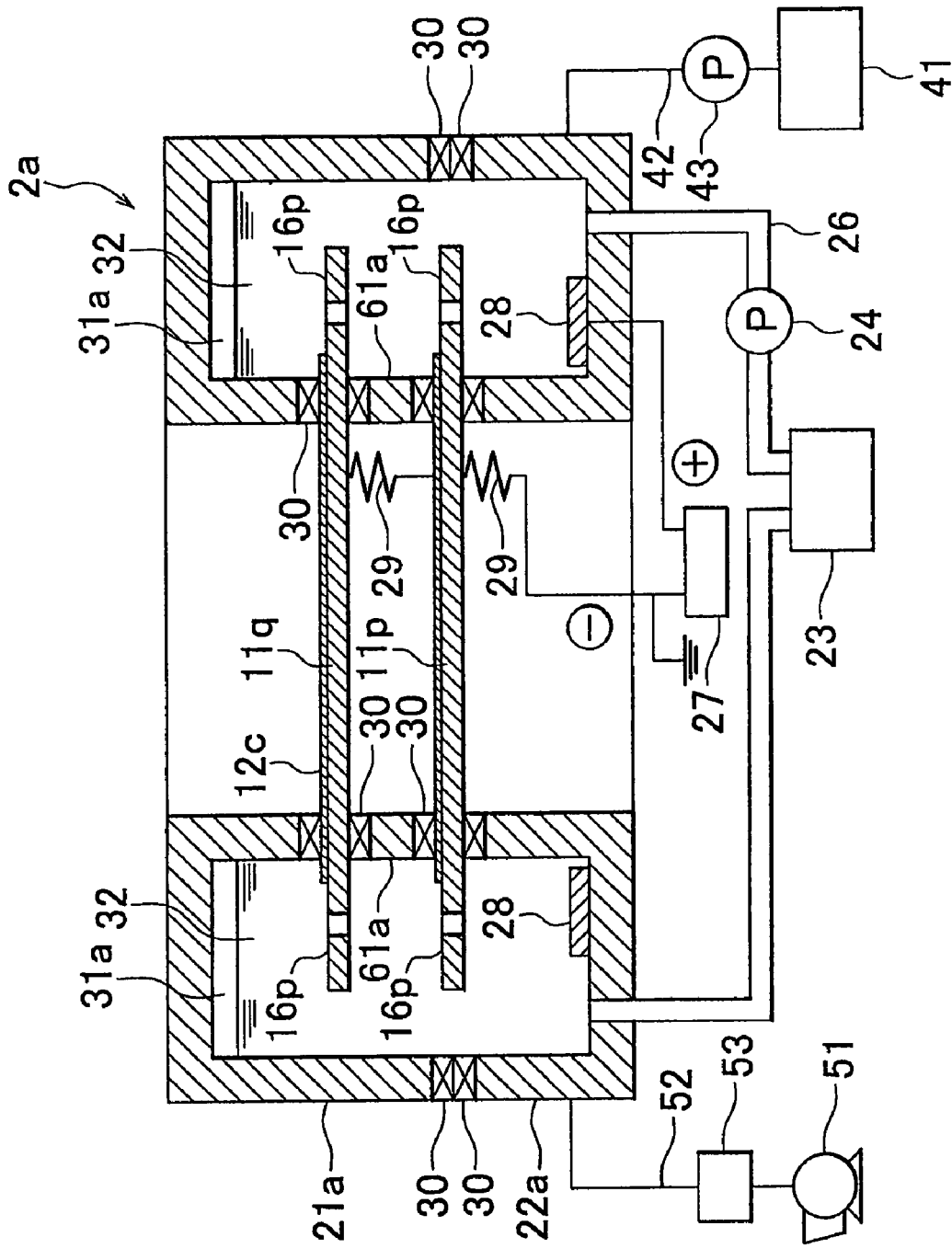

METHOD FOR PRODUCING SEPARATOR AND ELECTRODEPOSITION COATING DEVICE

FIELD OF THE INVENTION

The invention relates to a technology for performing electrodeposition coating.

BACKGROUND OF THE INVENTION

As conventional methods for forming a coating on a surface of a member, for example, a dipping method, a spray method, and an electrodeposition coating method are known. For example, Japanese Patent Application Publication No. JP 09-262519 A discloses a technology in which a coating is formed on only a predetermined portion by performing electrodeposition coating after masking the other portion by using UV cured resin.

When coating is performed by the dipping method or the spray method, it is difficult to form a coating having a uniform thickness on side surfaces of a platy member, and portions of a first surface and a second surface (a surface on the side opposite to the first surface) of the platy member, which are close to end portion of the platy member. In contrast to this, the thickness of a coating is likely to be made uniform when coating is performed by the electrodeposition coating method. However, it is difficult to form a coating on only a part of a member. Therefore, a portion on which coating is not performed is masked in advance, and the mask is removed after a coating is formed. These steps make the production process complicated.

DISCLOSURE OF THE INVENTION

It is an object of the invention to provide a technology for forming a coating having a uniform thickness on a part of a member with a simple production process.

According to an exemplary aspect of the invention, there is provided a following method for producing a separator of a fuel cell. A substrate of a separator (hereinafter, referred to as a "separator substrate") is set in an electrodeposition coating device, and a sealed electrodeposition chamber is formed by the electrodeposition coating device and the separator substrate. Then, electrodeposition coating is performed on the separator substrate in the electrodeposition chamber. When the separator substrate is set in the electrodeposition coating device, the separator substrate is arranged such that a portion of the separator substrate is located in the electrodeposition chamber, and the other portion of the separator substrate is located outside the electrodeposition chamber.

According to this aspect, a coating can be formed on the portion of the separator substrate, which is located in the electrodeposition chamber, by performing electrodeposition coating with a simple production process. In this case, a coating having a uniform thickness can be formed easily, since the coating is formed by electrodeposition coating. Also, it is possible not to form a coating on the other portion of the separator substrate, which is located outside the electrodeposition chamber.

When electrodeposition coating is performed, a voltage may be applied to the portion of the separator substrate, which is located in the electrodeposition chamber, while an electrodeposition solution is supplied to the electrodeposition chamber.

In addition, the electrodeposition solution may be collected from the electrodeposition chamber, after electrodeposition coating is finished. This step makes it possible to take the separator substrate out of the electrodeposition coating device without soiling an area around the electrodeposition coating device with the electrodeposition solution.

Also, after the electrodeposition solution is collected from the electrodeposition chamber, a cleaning fluid may be circulated in the electrodeposition chamber so that the portion of the separator substrate, which is located in the electrodeposition chamber, is cleaned. This step makes it possible to take the separator substrate out of the electrodeposition coating device without soiling hands of a worker and a handling device with the electrodeposition solution.

In addition, heated air may be circulated in the electrodeposition chamber so that inner walls that form the electrodeposition chamber and the portion of the separator substrate, which is located in the electrodeposition chamber, are dried. This step makes it possible to take the separator substrate out of the electrodeposition coating device without soiling the hands of the worker, the handling device, and the separator substrate with the electrodeposition solution.

When the separator substrate is set in the electrodeposition coating device, the separator substrate may be sandwiched between a first frame body and a second frame body of the electrodeposition coating device, whereby the electrodeposition chamber is formed by the first frame body, the second frame body and the separator substrate. Thus, electrodeposition coating can be performed on a portion having a desired shape in a first surface of the separator substrate by using the first frame body formed in a desired shape. Similarly, electrodeposition coating can be performed on a portion having a desired shape in a second surface (a surface on the side opposite to the first surface) of the separator substrate by using the second frame body formed in a desired shape.

In the above-mentioned exemplary aspect, the first frame body and the second frame body may be removed from each other so that the separator substrate is taken out of the electrodeposition coating device.

The separator substrate may be made of metal. An electrodeposition coating layer that is formed on the separator substrate by electrodeposition coating may be a primer for providing adhesion between a resin or rubber seal member formed on the separator substrate and the separator substrate. Also, the electrodeposition coating layer may be a primer for providing adhesion between a resin or rubber frame provided on the outer end portion of the separator substrate and the separator substrate. Thus, the separator substrate can be firmly bonded to the seal member and the frame by the primer that is formed so as to have a uniform thickness by the electrodeposition coating.

When the separator substrate is made of metal, the electrodeposition coating layer formed by electrodeposition coating may have an insulation property. Thus, the electrodeposition coating layer can prevent occurrence of the situation where the separator substrates, when stacked, contact each other and a short-circuit occurs.

Each of the above-mentioned methods can be performed by using a following electrodeposition coating device. The electrodeposition coating device includes a first frame body and a second frame body which sandwich a first object targeted for electrodeposition coating, thereby forming, along with the first object, an electrodeposition chamber that stores an electrodeposition solution therein. The first frame body and the second frame body form the sealed electrodeposition chamber while a portion of the first object is located in the electrodeposition chamber and the other portion of the first object is located outside the electrodeposition chamber.

With such an electrodeposition coating device, a coating can be formed on only a portion of an object without forming a coating on the other portion of the object. Namely, a coating having a uniform thickness can be formed on only a portion of a member with a simple production process.

The other portion of the first object may be a center portion of the first object, and the portion of the first object may be an outer end portion of the first object, which is located around the center portion. The first frame body and the second frame body may form an annular electrodeposition chamber. Thus, a coating having a uniform thickness can be formed on the surface of the first object with the center portion left uncoated, without masking the center portion.

The electrodeposition coating device may include the first frame body and the second frame body which sandwich plural objects that are targeted for electrodeposition coating and that are arranged with a space kept therebetween, and a third frame body that is provided between the plural objects. In this case, the first frame body, the second frame body, and the third frame body may form, along with the plural objects, the electrodeposition chamber which stores the electrodeposition solution therein. The first frame body, the second frame body, and the third frame body may form the annular electrodeposition chamber while a center portion of each object is located outside the electrodeposition chamber and an outer end portion of each object, which is around the center portion, is located in the electrodeposition chamber. Thus, coatings each of which has a uniform thickness can be formed on the plural objects at the same time.

The electrodeposition coating device may include a cleaning portion which circulates a cleaning fluid in the electrodeposition chamber, thereby cleaning the portion of the object, which is located in the electrodeposition chamber. Thus, both the electrodeposition coating step and the cleaning step can be performed by one device.

The electrodeposition coating device may include a drying portion which circulates heated air in the electrodeposition chamber, thereby drying inner walls of the frame bodies that form the electrodeposition chamber and the portion of the object, which is located in the electrodeposition chamber. Thus, all the electrodeposition coating step, the cleaning step, and the drying step can be performed by one device.

Note that, the invention can be realized in various aspects. The invention can be applied to, for example, a method and device for forming a coating, a method and device for performing electrodeposition coating, and a method and device for producing a separator of a fuel cell.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3A is a cross sectional view and FIG. 3B is a plan view, which show an electrodeposition coating device;

FIG. 5 is a cross sectional view showing an electrodeposition coating device according to a second embodiment.

DETAILED DESCRIPTION OF THE EXEMPLARY EMBODIMENTS

A: First Embodiment

Figure 1A:
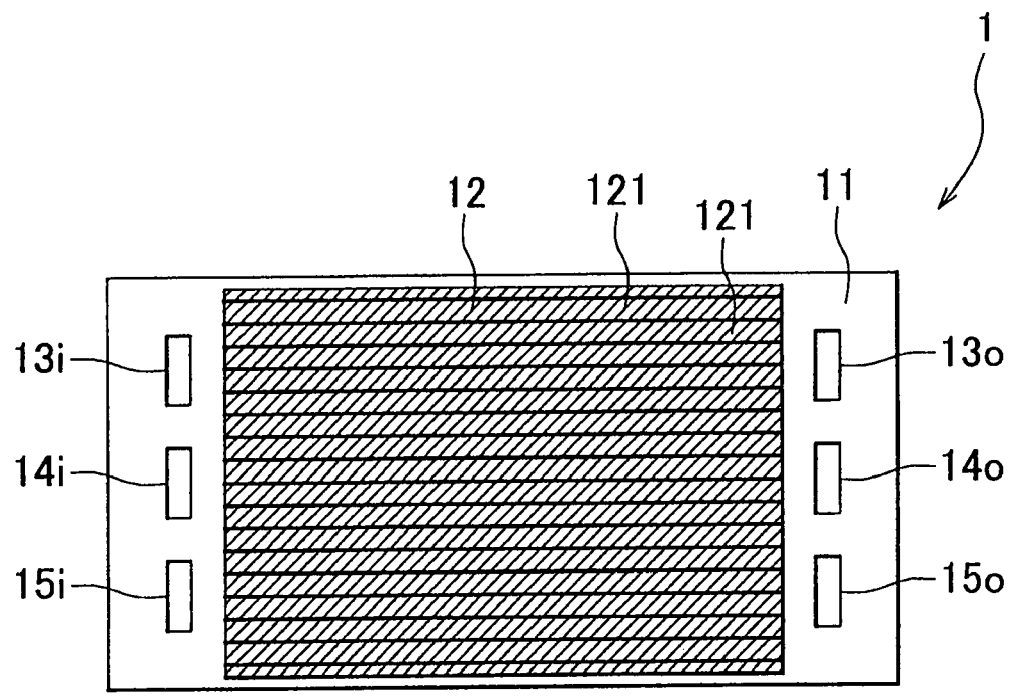
FIGS. 1A, 1B and 1C are views showing steps of producing a separator of a fuel cell.
Figure 1B:
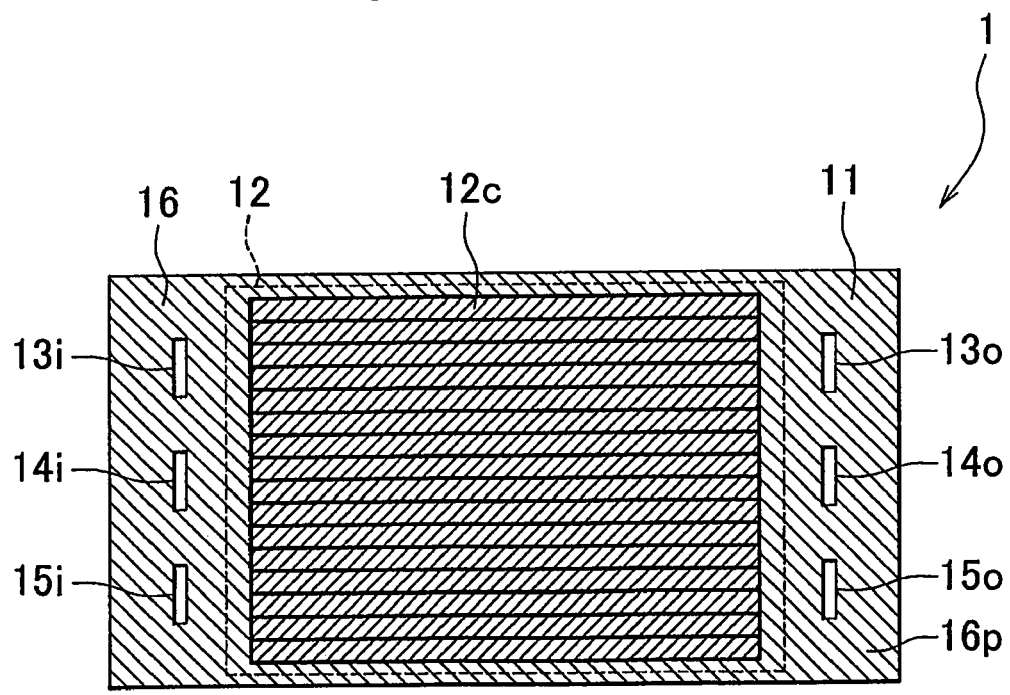
Figure 1C:
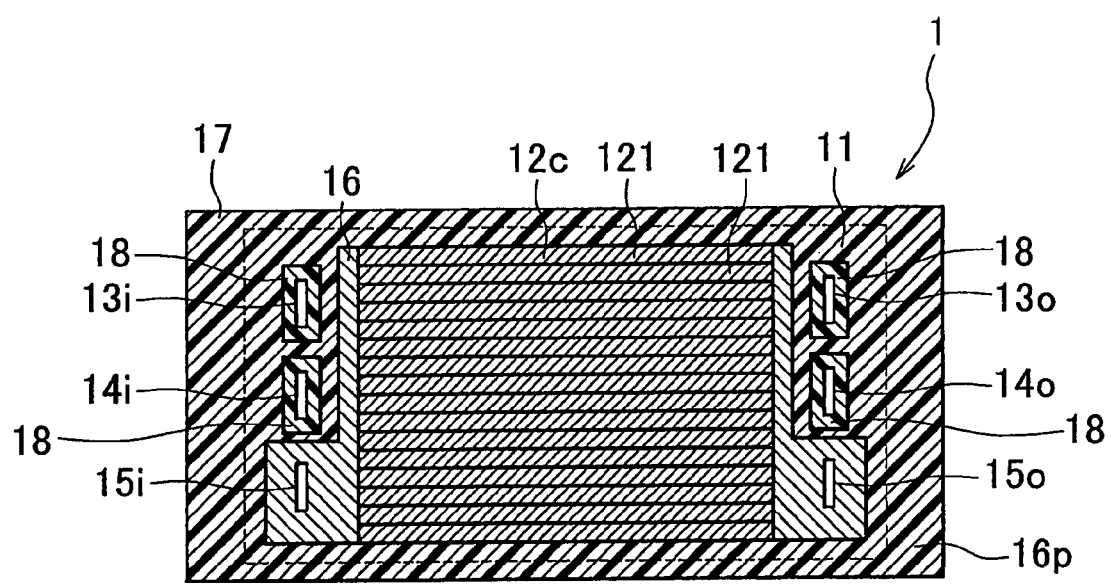

Hereafter, a first embodiment of the invention will be described. FIGS. 1A, 1B and 1C are views showing steps for producing a separator 1 of a fuel cell. In the production of the separator 1 of a fuel cell, first, a rectangular substrate 11 made of stainless alloy, shown in FIG. 1A, is prepared. The thickness of the substrate 11 is approximately 0.1 mm to approximately 0.5 mm. For example, the thickness of the substrate 11 may be approximately 0.3 mm. In the substrate 11, first openings 13$i$, 13$o$ through which fuel gas of the fuel cell flows, second openings 14$i$, 14$o$ through which a coolant flows, and third openings 15$i$, 15$o$ through which air flows are formed in a direction perpendicular to the direction in which the separator 1 extends (i.e. a direction perpendicular to a sheet on which FIGS. 1A, 1B, and 1C are drawn). Plural groove portions 121 are formed in parallel in a center portion 12 of the substrate 11 in a longitudinal direction of the rectangular substrate 11. The groove portions 121 include the groove portions 121 through which fuel gas flows, the groove portions 121 through which air flows, and the groove portions 121 through which a coolant flows. The center portion 12 in which the groove portions 121 are formed is coated with gold plating. Note that, the groove portions 121 may be surface-treated with carbon coating instead of gold plating.

Then, a primer 16 is formed on an outer end portion of the substrate 11, as shown by widely spaced hatch lines in FIG. 1B. The primer 16 is used for increasing a degree of adhesion between a resin frame 17 formed on the outer end portion of the substrate 11 and the substrate 11. The thickness of the coating of the primer 16 is approximately 10 µm to approximately 50 µm. For example, the thickness of the coating may be approximately 30 µm. The substrate 11 is covered with the primer 16 except a portion 12$c$, which is a part of the center portion 12 other than an outer end portion thereof and at which the gold plating is exposed (hereinafter, referred to as a "non-coated portion 12$c$"), and except a portion (not shown) in the second surface, which corresponds to the non-coated portion 12$c$. Since the substrate 11 is covered with the primer 16, corrosion of the portion in the substrate 11, which is covered with the primer 16, during an operation of a fuel cell is prevented. In FIG. 1B, an outer end portion 16$p$, which is shown by more widely spaced hatch lines than the hatch lines showing the non-coated portion 12$c$, is the portion in the substrate 11, which is covered with the primer 16.

The portion that is shown by the widely spaced hatch lines and that is located inside of a dashed line in FIG. 1B is a portion which is coated with gold plating and which is also covered with the primer 16. Namely, a part of the portion which is coated with gold plating is also covered with the primer 16. With such a structure, corrosion can be prevented by the primer 16 even at the portion which is located near the outer end portion of the groove portions 121, and which is not coated with gold plating. The primer 16 also covers side surfaces of the substrate 11, and end surface of the substrate 11, in which the first openings 13$i$, 13$o$, the second openings 14$i$, 14$o$, and the third openings 15$i$, 15$o$ are formed. As a result, corrosion of these surfaces can be also prevented.

Then, as shown in FIG. 1C, the resin frame 17 is formed on the outer end portion of the substrate 11 by insert molding. The thickness of the resin frame 17 is approximately 1 mm to approximately 5 mm. For example, the thickness of the resin frame 17 may be approximately 2 mm. The resin frame 17 has the insulation property, and prevents occurrence of a short-circuit between the separators 1, when plural separators 1 are stacked. The primer 16 also has the insulation property. Therefore, the resin frame 17 prevents occurrence of the situation where the portion covered with the primer 16 contacts another metal component and a short-circuit occurs. The frame 17 also provides sealing so that the air flowing through the third openings 15i, 15o does not leak in a direction along the surface of the substrate 11 shown in FIG. 1C.

In addition, a resin seal member 18 is formed around each of the first openings 13i, 13o, and each of the second openings 14i, 14o. Due to the seal member 18, the fuel gas flowing through the first openings 13i, 13o flows in the separator 1 in a direction perpendicular to the direction in which the substrate 11 extends, without leaking to the outside of the separator 1, and the coolant flowing through the second openings 14i, 14o flows in the separator 1 in the direction perpendicular to the direction in which the substrate 11 extends, without leaking to the outside of the separator 1. The seal members 18 and the resin frame 17 are firmly bonded to the substrate 11 with the primer 16 interposed therebetween.

Figure 2A:
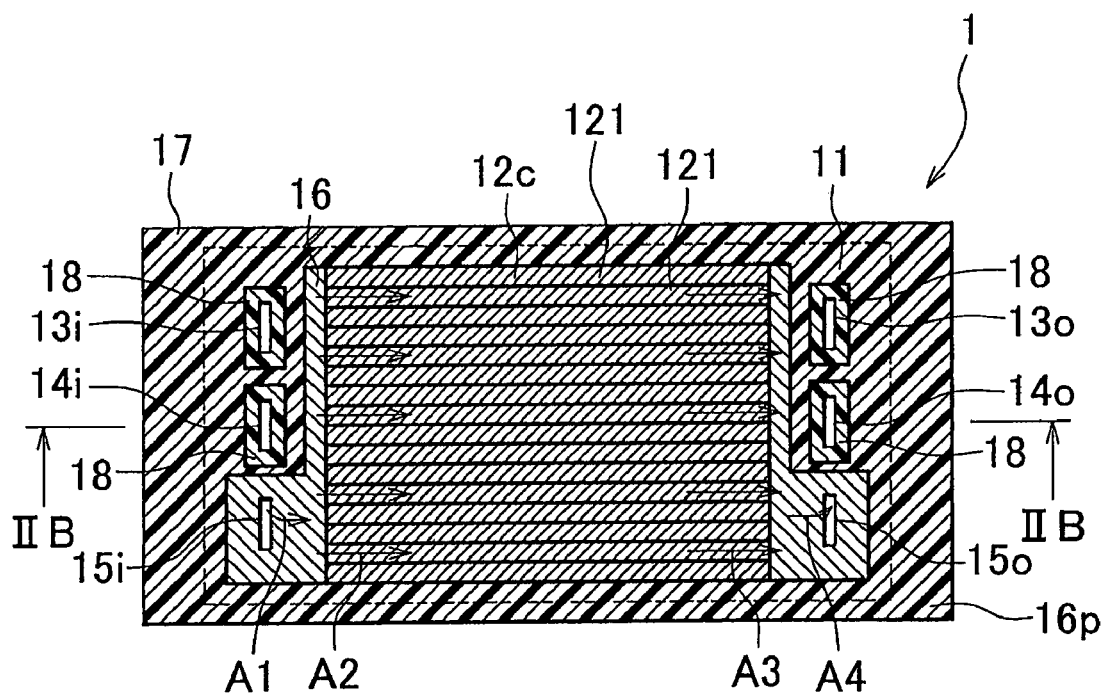
FIG. 2A is a plan view and FIG. 2B is a cross sectional view, which show a structure of the separator of a fuel cell.
Figure 2B:
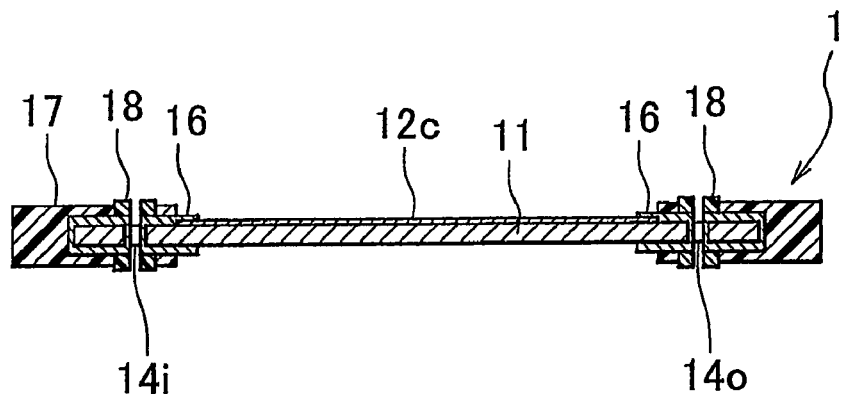

FIG. 2A is a plan view showing the separator 1 of a fuel cell. FIG. 2B is a cross sectional view taken along line IIB-IIB in FIG. 2A. The resin frame 17 serves as a guide wall that selectively permits/interrupts communication between the first openings 13i, 13o, the second openings 14i, 14o and the third openings 15i, 15o, and the groove portions 121. In FIG. 1C and FIG. 2A, each of the first openings 13i, 13o through which fuel gas flows, and the second openings 14i, 14o through which a coolant flows is surrounded by the resin frame 17 and the seal member 18. Therefore, when the separators are stacked, the fuel gas and the coolant pass through the separator 1 in the direction perpendicular to the direction in which the substrate 11 extends, without flowing through the groove portions 121 of the separator 11 shown in FIGS. 1A, 1B, and 1C, and FIGS. 2A and 2B. In contrast to this, the third openings 15i, 15o through which air flows are not surrounded by the resin frame 17 nor the seal portion 18. Therefore, communication between the third openings 15i, 15o and the groove portions 121 is not interrupted. Accordingly, the air which has flowed through the third opening 15i in the direction perpendicular to the direction in which the substrate 11 extends and reached the separator 1 flows through the groove portions 121 and eventually reaches the third opening 15o, as shown by arrows A1, A2, and A3. Then, as shown by an arrow A4, the air flows through the third opening 15o and flows again in the direction perpendicular to the direction in which the substrate 11 extends.

Figure 3A:
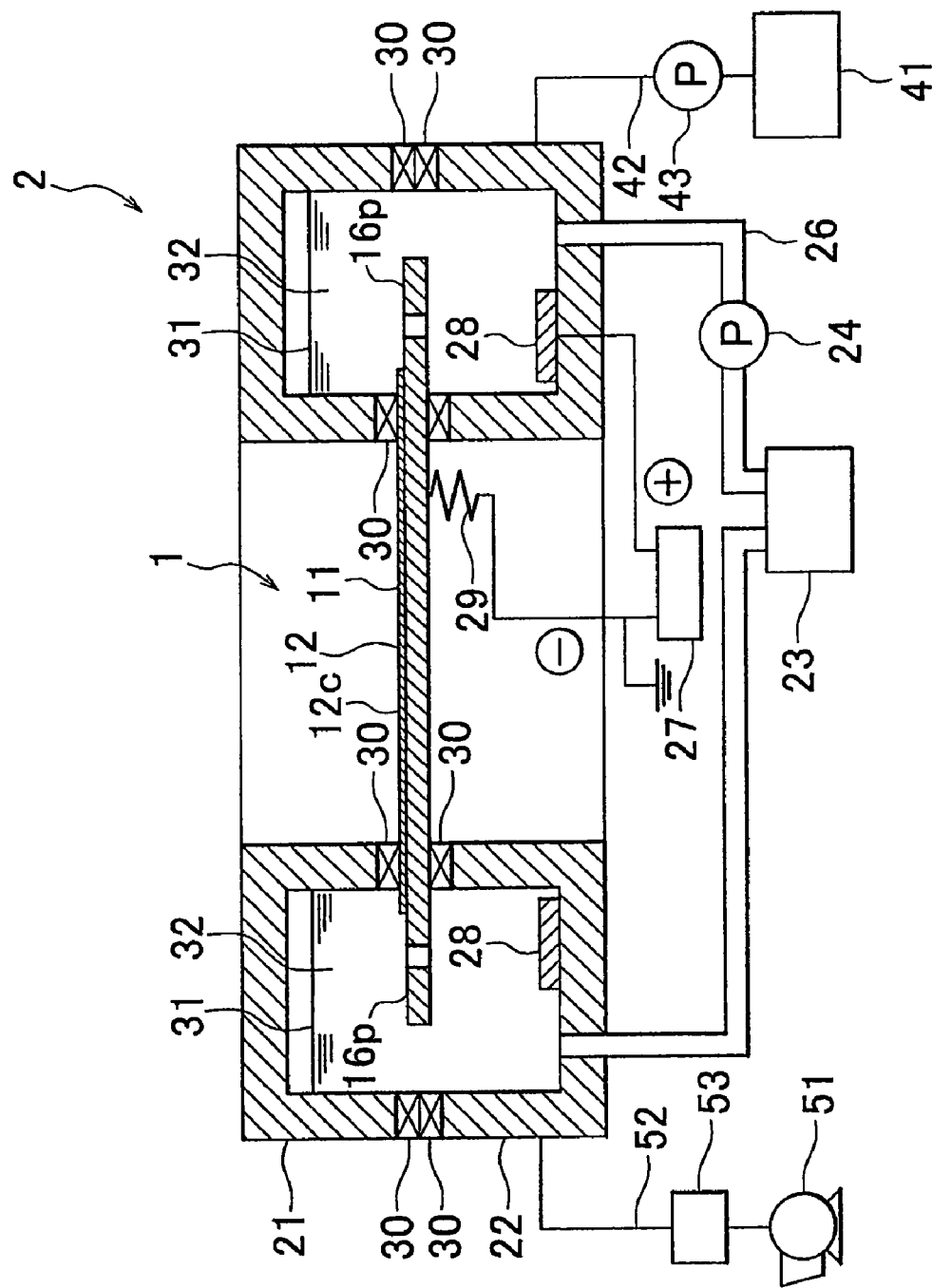

FIG. 3A is a cross sectional view and FIG. 3B is a plan view, which show the electrodeposition coating device 2. The electrodeposition coating device 2 includes an upper frame 21 and a lower frame 22. The upper frame 21 and the lower frame 22 sandwich the substrate 11 from above and from below, respectively, thereby forming a sealed and annular electrodeposition chamber 31. Note that, in this specification, an "annular" shape means an endless shape. Therefore, the "annular" shape includes not only a ring shape but also a polygonal endless shape and other complicated endless shapes.

As shown in FIG. 3B, each of the upper frame 21 and the lower frame 22 of the electrodeposition coating device 2 has a rectangle-annular shape. A space surrounded by two dashed lines in FIG. 3B is the electrodeposition chamber 31. In FIG. 3B, the shape of the substrate 11 is shown by an alternate long and short dashed line. As shown in FIGS. 3A and 3B, the substrate 11 is located in the electrodeposition chamber 31 at only the outer end portion 16p, and is located outside the electrodeposition chamber 31 at the non-coated portion 12c.

Each of the upper frame 21 and the lower frame 22 has gaskets 30 at an end surface at which the upper frame 21 and the lower frame 22 contact each other and at an end surface which contacts the substrate 11. Accordingly, when the substrate 11 is sandwiched between the upper frame 21 and the lower frame 22, the sealed and annular electrodeposition chamber 31 is formed. Since the upper frame 21 and the lower frame 22 have such a structure, electrodeposition coating of the primer 16 can be performed on only the outer end portion 16p of the substrate 11, as shown in FIG. 1B.

The electrodeposition coating device 2 further includes an electrodeposition coating solution tank 23 which stores an electrodeposition solution therein; a circulation pipe 26 through which the electrodeposition solution is circulated between the electrodeposition coating solution tank 23 and the electrodeposition chamber 31; and a circulation pump 24 which circulates the electrodeposition coating solution through the circulation pipe 26.

The electrodeposition coating device 2 further includes a DC power supply 27 which has several tens of volts; a cathode 28 which is provided in the electrodeposition chamber 31 and which is connected to the DC power supply 27; and an anode 29 which is formed of a spring that contacts the separator 1 set in the electrodeposition coating device 2.

The electrodeposition coating device 2 further includes a cleaning water tank 41 which stores purified water for cleaning the inside of the electrodeposition chamber 31; a cleaning water pipe 42 through which water for cleaning is supplied from the cleaning water tank 41 to the electrodeposition chamber 31; and a cleaning water pump 43. The cleaning water which has been used for cleaning the inside of the electrodeposition chamber 31 is collected into a collecting device (not shown). The electrodeposition coating solution is extracted from the collected cleaning water, and the extracted electrodeposition coating solution is used again.

The electrodeposition coating device 2 further includes a blower 51 which supplies air for drying the inside of the electrodeposition chamber 31; an air pipe 52; and a heater 53 for heating the air to be supplied into the electrodeposition chamber 31 by the blower 51.

Figure 4:
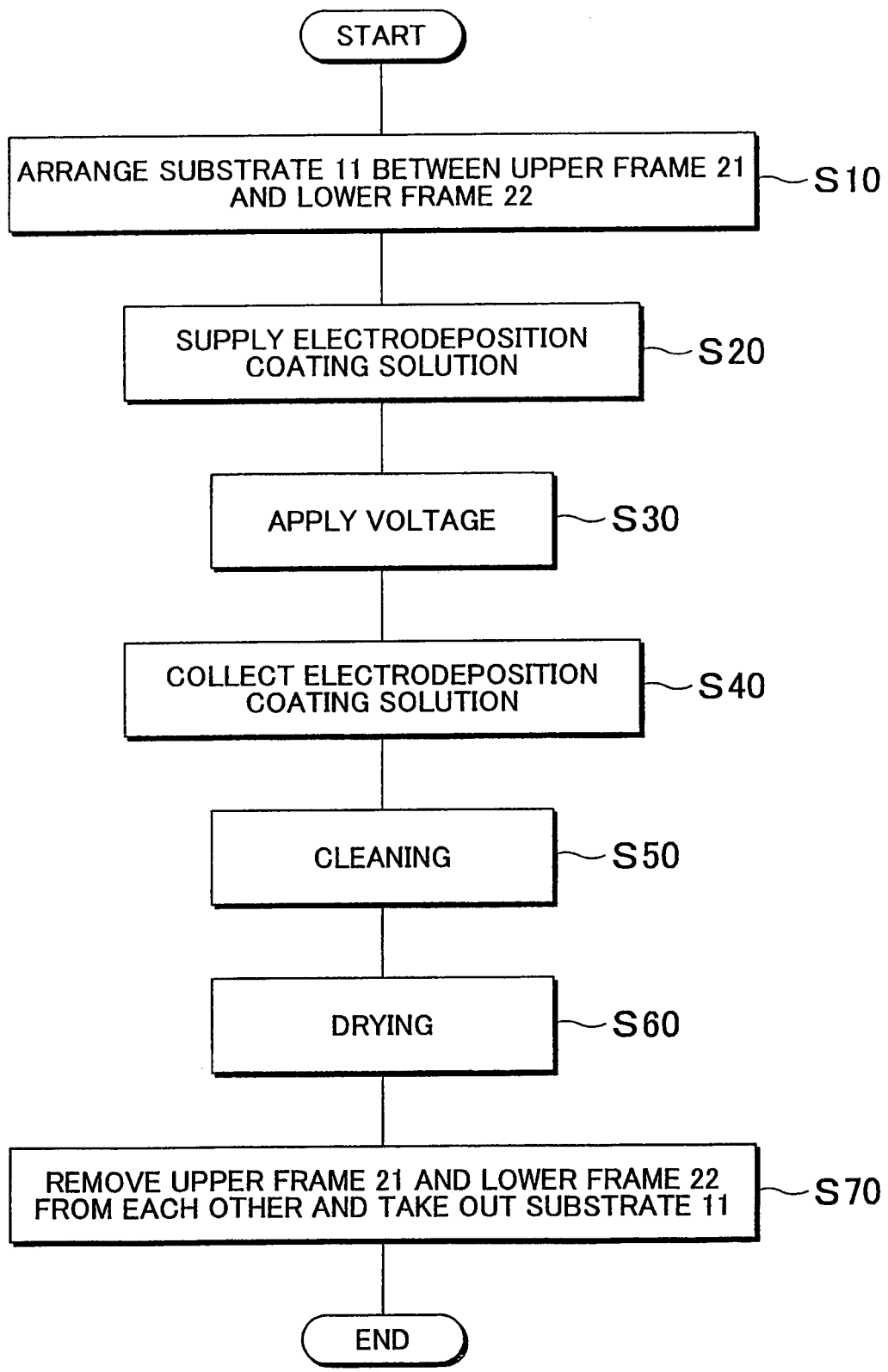
FIG. 4 is a flowchart showing steps of an electrodeposition coating process.

FIG. 4 is a flowchart showing steps of an electrodeposition coating process. In step S10, the substrate 11 is arranged between the upper frame 21 and the lower frame 22, and the upper frame 21 and the lower frame 22 are made to contact the substrate 11 at a predetermined contacting portion. As a result, the sealed and annular electrodeposition chamber 31 is formed, as shown in FIG. 3A. The outer end portion 16p of the substrate 11 is located in the electrodeposition chamber 31. At this time, the anode 29 contacts the second surface of the substrate 11.

In step S20, the circulation pump 24 is operated so that an electrodeposition coating solution 32 is supplied into the electrodeposition chamber 32. As the electrodeposition coating solution 32, for example, a coating medium such as polyimide resin, epoxy resin or acrylic resin may be used. Then, an electrodeposition coating solution 32 is circulated between the electrodeposition coating solution tank 23 and the inside of the electrodeposition chamber 31. In step S30, a voltage is applied by the DC power supply 27, and electrodeposition coating of the primer 16 is performed on the substrate 11. In the first embodiment, since the primer 16 is formed by electrodeposition coating, a primer having a uniform thickness can be formed on each of the first surface, the second surface, and the side surfaces of the separator 1.

In this specification, in a broad sense, the term "electrodeposition coating" means a surface treatment method including steps such as drying by heated air. In this specification, however, in a limited sense, the term "electrodeposition coating" means a process in which a voltage is applied to an object and an electrodeposition coating is applied to the surface of the object. Namely, when the term "electrodeposition coating" is used to signify this process, the steps such as drying by the heated air is not included in "electrodeposition coating" in the limited sense.

In step S40, the circulation pump 24 is stopped so that circulation of the electrodeposition coating solution 32 is stopped, and the electrodeposition coating solution 32 is collected into the electrodeposition coating solution tank 23. In step S50, the cleaning water pump 43 is operated so that the purified water is supplied from the cleaning water tank 41 into the electrodeposition chamber 31. As a result, the inner walls of the upper frame 21 and the lower frame 22 and the substrate 11 on which the electrodeposition coating is performed are cleaned. The water which has been used for cleaning and which contains the electrodeposition solution is collected, the electrodeposition coating solution is extracted from the collected water, and the extracted electrodeposition coating solution is used again.

In step S60, the blower 51 and the heater 53 are operated so that heated air is supplied into the electrodeposition chamber 31, and the inner walls of the upper frame 21 and the lower frame 22 and the substrate 11 are dried. In step S70, the upper frame 21 and the lower frame 22 are removed from each other, and the substrate 11 on which the electrodeposition coating is performed is taken out of the electrodeposition coating device 2. Since the substrate 11 and the inner walls of the upper frame 21 and the lower frame 22 have been cleaned and dried, the electrodeposition solution does not drip onto the electrodeposition coating device 2 and elements near the electrodeposition coating device 2 when the substrate 11 is taken out of the electrodeposition coating device 2.

An electrodeposition coating can be applied to only the outer end portion 16p with the non-coated portion 12c in the center portion of the substrate 11 left uncoated, by performing electrodeposition coating by using the electrodeposition coating device 2 according to the first embodiment (refer to FIG. 1B). As a result, a coating having a uniform thickness can be formed on only the outer end portion 16p of the substrate 11. Also, since masking need not be provided and, therefore, removal of masking need not be performed during formation of a coating, electrodeposition coating can be performed with a simple production process. As a result, electrodeposition coating can be efficiently performed at low cost.

Also, the electrodeposition coating device 2 according to the first embodiment can perform all the electrodeposition coating step, the cleaning step, and the drying step. Accordingly, electrodeposition coating can be efficiently performed at low cost.

B: Second Embodiment

Hereafter, a second embodiment of the invention will be described. FIG. 5 is a cross sectional view showing an electrodeposition coating device 2a according to the second embodiment. The electrodeposition coating device 2a includes a middle frame 61a in addition to the upper frame 21a and the lower frame 22a. The electrodeposition coating device 2a includes anodes 29a, 29a which contact two substrates 11p, 11q, respectively. With such a structure, the electrodeposition coating device 2a can perform electrodeposition coating on the two substrates 11p, 11q at the same time. The electrodeposition coating device 2a according to the second embodiment is the same as the electrodeposition coating device 2 according to the first embodiment except for this feature.

The middle frame 61a has an annular shape corresponding to the shape of a portion around the non-coated portion 12c (refer to FIG. 1B). As shown in FIG. 5, the middle frame 61a is provided between the two substrates 11p and 11q when electrodeposition coating is performed. As in the case of the upper frame 21a and the lower frame 22a, the middle frame 61a has gaskets 30 at each of the end surfaces contacting the substrates 11p, 11q. Accordingly, when the substrate 11 is sandwiched between the upper frame 21 and the lower frame 22, and the middle frame 61a is sandwiched between the substrates 11p and 11q, a sealed and annular electrodeposition chamber 31a is formed. The steps of the electrodeposition coating process are the same as those in the first embodiment.

According to the second embodiment, electrodeposition coating can be performed on the two substrates 11p, 11q at the same time. Accordingly, the separator 1 can be produced efficiently.

C: MODIFIED EXAMPLES

C1: First Modified Example

In the first embodiment, in the second surface of the substrate 11, the portion corresponding to the non-coated portion 12c of the first surface is not covered with the primer 16. However, the portion in the first surface of the substrate 11, to which the primer 16 is applied, can be formed into a desired shape by forming the end portion of the upper frame 21, which contacts the substrate 11, into a desired shape. Also, by forming the end portion of the lower frame 21, which contacts the substrate 11, into a desired shape that is different from the desired shape of the first surface of the substrate 11, the portion in the second surface of the substrate 11, to which the primer 16 is applied, can be formed into the different desired shape.

Similarly, in the second embodiment, the portion in the upper surface of the substrate 11p, to which the primer 16 is applied, can be formed into a desired shape by forming the end portion of the middle frame 61a, which contacts the substrate 11p, into a desired shape. Also, the portion in the lower surface of the substrate 11q, to which the primer 16 is applied, can be formed into a desired shape by forming the end portion of the middle frame 61a, which contacts the substrate 11q, in a desired shape.

C2: Second Modified Example

In the above-mentioned embodiments, the upper frames 21, 21a, the lower frames 22, 22a, and the middle frame 61a are provided as separate components (refer to FIGS. 3A, and 3B, and FIG. 5). However, the upper frame, the lower frame and the middle frame need not be provided as the separate bodies. The upper frame, the lower frame, and the middle frame may be connected to each other at a give portion. Namely, the structure of the electrodeposition coating device is not limited, as long as the electrodeposition coating device includes the upper frame and the lower frame which sandwich the object regardless of whether these frame bodies are formed as the separate bodies or an integral body. In the embodiment where the electrodeposition coating is performed on plural objects at the same time, the electrodeposition coating device may include the middle frame that is provided between the plural objects regardless of whether the middle frame is formed separately from the upper frame and the lower frame or integrally with the upper frame and the lower frame. The upper frame can be regarded as a first frame body of the present invention. The lower frame can be regarded as a second frame body of the present invention. The middle frame can be regarded as a third frame body of the present invention.

C3: Third Modified Example

In the above-mentioned embodiments, purified water is used for cleaning the substrate 11 and the inner walls of the electrodeposition chamber 31 after the electrodeposition coating is finished. However, the liquid used for cleaning is not limited to purified water, and another solvent such as methanol may be used.

In the above-mentioned embodiments, the air used for drying is heated by the heater. However, means for heating the air is not limited to the heater. For example, a heat exchanger which transmits heat from another heat source to the air may be used.

C4: Fourth Modified Example

In the above-mentioned embodiments, the resin frame 17 and the seal member 18 are made of resin. However, the resin frame 17 and the seal member 18 may be made of rubber. Namely, the primer formed on the substrate 11 by electrodeposition coating may be a primer which improves a degree of adhesion between the metal and resin or rubber.

In the above-mentioned embodiments, the electrodeposition coating devices 2, 2a are used for forming the primer that provides adhesion between the resin frame and the substrate 11 of the separator 1 of a fuel cell. However, the electrodeposition coating device according to the invention can be used for another purpose. Namely, the electrodeposition coating device according to the invention can be applied not only to the separator of a fuel cell but also to an object to which a surface coating having a uniform thickness is applied, wherein the surface coating is performed on at least one portion which sandwiches a portion that is not is targeted for coating.

The invention claimed is:

1. A method for producing a separator of a fuel cell, comprising:
    a step (a) of setting a separator substrate in an electrodeposition coating device, and forming a sealed electrodeposition chamber by using the electrodeposition coating device and the separator substrate; and
    a step (b) of performing electrodeposition coating on the separator substrate in the electrodeposition chamber, wherein
    the step (a) includes a step of arranging the separator substrate such that an outer end portion of the separator substrate is located in the electrodeposition chamber, and the center portion of the separator substrate is located outside the electrodeposition chamber; and
    in the step (a), the separator substrate is sandwiched between a first frame body and a second frame body of the electrodeposition coating device, whereby the electrodeposition chamber is formed by the first frame body, the second frame body, and the separator substrate such that the first frame body and the second frame body form an annular electrodeposition chamber.

2. The method for producing a separator of a fuel cell according to claim 1, wherein
    the step (b) includes a step of applying a voltage to the outer end portion of the separator substrate, which is located in the electrodeposition chamber, while supplying an electrodeposition solution to the electrodeposition chamber.

3. The method for producing a separator of a fuel cell according to claim 2, further comprising:
    a step (c) of collecting the electrodeposition solution from the electrodeposition chamber.

4. The method for producing a separator of a fuel cell according to claim 3, further comprising:
    a step (d) of circulating a cleaning fluid in the electrodeposition chamber, thereby cleaning the outer end portion of the separator substrate, which is located in the electrodeposition chamber.

5. The method for producing a separator of a fuel cell according to claim 4, further comprising:
    a step (e) of circulating heated air in the electrodeposition chamber, thereby drying inner walls that form the electrodeposition chamber, and the outer end portion of the separator substrate, which is located in the electrodeposition chamber.

6. The method for producing a separator of a fuel cell according to claim 5, further comprising:
    a step (f) of removing the first frame body and the second frame body from each other, and taking the separator substrate out of the electrodeposition coating device.

7. The method for producing a separator of a fuel cell according to claim 1, wherein
    the separator substrate is made of metal, and
    an electrodeposition coating layer that is formed on the separator substrate by the electrodeposition coating is a primer for providing adhesion between a resin or rubber seal member formed on the separator substrate and the separator substrate.

8. The method for producing a separator of a fuel cell according to claim 1, wherein
    the separator substrate is made of metal, and
    an electrodeposition coating layer that is formed on the separator substrate by the electrodeposition coating is a primer for providing adhesion between a resin or rubber frame provided on an outer end portion of the separator substrate and the separator substrate.

9. The method for producing a separator of a fuel cell according to claim 1, wherein
    the separator substrate is made of metal, and
    an electrodeposition coating layer that is formed by the electrodeposition coating has an insulation property.

10. An electrodeposition coating device, comprising:
    a first frame body and a second frame body that sandwich a first object on which electrodeposition coating is performed, thereby forming, along with the first object, an electrodeposition chamber that stores an electrodeposition solution, wherein
    the first frame body, the second frame body and the first object form a sealed annular electrodeposition chamber while an outer end portion of the first object is located in the electrodeposition chamber and the center portion of the first object is located such that the electrodeposition chamber is located around the center portion of the first object, and the first object is sandwiched between the first frame body and the second frame body of the electrodeposition coating device.

11. The electrodeposition coating device according to claim 10, further comprising:
    a third frame body which is provided between a second object and the first object on each of which electrodeposition coating is performed, wherein the first frame body, the second frame body, and the third frame body form, along with the first object and the second object, the electrodeposition chamber which stores the electrodeposition solution, and the first frame body, the second frame body, and the third frame body form the annular electrodeposition chamber while a center portion of the second object is located outside the electrodeposition chamber and an outer end portion of the second object, which is around the center portion of the second object, is located in the electrodeposition chamber.

12. The electrodeposition coating device according to claim 10, further comprising:

a cleaning portion which circulates a cleaning fluid in the electrodeposition chamber, thereby cleaning the outer end portions of the first object and the second object, which are located in the electrodeposition chamber.

13. The electrodeposition coating device according to claim 12, further comprising:

a drying portion which circulates heated air in the electrodeposition chamber, thereby drying inner walls of the first frame body, the second frame body and the third frame body that form the electrodeposition chamber, and the outer end portions of the first object and the second object, which are located in the electrodeposition chamber.

14. An electrodeposition coating method, comprising:

setting an object in an electrodeposition coating device such that an outer end portion of the object is located in an electrodeposition chamber of the electrodeposition coating device and the center portion of the object is located outside the electrodeposition chamber, thereby forming the sealed electrodeposition chamber by using the electrodeposition coating device and the object; and performing electrodeposition coating on the object in the electrodeposition chamber, wherein the first object is sandwiched between a first frame body and a second frame body of the electrodeposition coating device, whereby the electrodeposition chamber is formed by the first frame body, the second frame body, such that the first frame body and the second frame body form an annular electrodeposition chamber.

15. The electrodeposition coating method according to claim 14, wherein a voltage is applied to the portion of the separator substrate, which is located in the electrodeposition chamber, while supplying an electrodeposition solution to the electrodeposition chamber.

16. The electrodeposition coating method according to claim 15, further comprising:

collecting the electrodeposition solution from the electrodeposition chamber.

17. The electrodeposition coating method according to claim 16, further comprising:

circulating a cleaning fluid in the electrodeposition chamber, thereby cleaning the outer end portion of the separator substrate, which is located in the electrodeposition chamber.

18. The electrodeposition coating method according to claim 17, further comprising:

circulating heated air in the electrodeposition chamber, thereby drying inner walls that form the electrodeposition chamber, and the outer end portion of the separator substrate, which is located in the electrodeposition chamber.

19. The electrodeposition coating method according to claim 15, further comprising:

removing the first frame body and the second frame body from each other, and taking, the separator substrate out of the electrodeposition coating device.

* * * * *